United States Patent [19]

Holtz

[11] 3,904,942

[45] Sept. 9, 1975

[54] SYSTEM FOR OPERATING A SELF-PROPELLED TRACK BOUND VEHICLE WITH A LINEAR SYNCHRONOUS MOTOR

[75] Inventor: Joachim Holtz, Erlangen, Germany

[73] Assignee: Siemens Aktiengesellschaft, Munich, Germany

[22] Filed: Aug. 1, 1974

[21] Appl. No.: 493,895

[30] Foreign Application Priority Data

Aug. 17, 1973 Germany............................ 2341761

[52] U.S. Cl. .......... 318/135; 104/148 LM; 318/687
[51] Int. Cl.² ........................................... H02P 5/00
[58] Field of Search .......... 318/135, 127, 132, 687; 104/148 LM

[56] References Cited
UNITED STATES PATENTS

| | | |
|---|---|---|
| 3,549,966 | 12/1970 | Wilson ........................ 104/148 LM |
| 3,740,628 | 6/1973 | Inagaki et al. ...................... 318/135 |
| 3,839,664 | 10/1974 | Dirks .............................. 318/135 X |

*Primary Examiner*—R. N. Envall, Jr.
*Attorney, Agent, or Firm*—Kenyon & Kenyon Reilly Carr & Chapin

[57] ABSTRACT

A circuit arrangement for the operation of a track-bound self-propelled (or propulsion) vehicle driven by a synchronous linear motor with the stator of the linear motor installed along the roadway as a traveling field winding, and its exciter winding on the vehicle as a co-moving translator, in which the stator of the synchronous linear motor is supplied with variable voltage and frequency by a stationary, controlled static converter timed as a function of the position of the translator relative to the stator with the position calculated by a computing circuit using values of the voltage and current which exist at the feeding point of the converter into the stator.

25 Claims, 11 Drawing Figures

3,904,942

SYSTEM FOR OPERATING A SELF-PROPELLED TRACK BOUND VEHICLE WITH A LINEAR SYNCHRONOUS MOTOR

BACKGROUND OF THE INVENTION

This invention relates to track-bound self-propelled (or propulsion) vehicles with a synchronous linear motor in general and more particularly to an improved method of supplying power to such a motor.

Linear motors offer an excellent means of providing propulsion for track-bound self-propelled vehicles used in rapid-transit railroads and for high performance rapid-transit railroads operating at speeds up to 500 km/hr. Among the individual variants of this type of motor a synchronous linear motor whose stator is installed along the roadway as a travelling field winding and whose exciter is installed in the vehicle as a co-movable translator demonstrates high efficiency and simple energy transmission. Such a synchronous linear motor is also referred to as a synchronous long-stator motor because of the unusual length of the stator. In the following, the term "linear motor" always refers to such a long stator motor.

As is well known by those skilled in the art, a synchronous linear motor consists of two parts (see Arch. f. Elektrotechn, vol. 55, no. 1 (1972) pages 13 to 20.) Thus, either a d-c carrying exciter winding, which may extend over the entire length of the vehicle, or a permanent magnet is installed on the self-propelled vehicle as the co-moving exciter (translator.) A traveling-field winding (stator) is installed along the roadbed. The traveling-field winding, which generally is a multiphase winding, produces a traveling field which travels in the longitudinal direction of the roadbed and drives the vehicle, as a function of the voltage and frequency supplied thereto.

It is possible to subdivide the entire transit line into a number of line sections, to provide each line section with a multi-phase stator winding and to feed the individual stators of the multi-part synchronous linear motor so formed with variable voltage and frequency from a number of controlled static converters, which are distributed along the roadbed. If the converter is timed from the synchronous machine, a circuit arrangement comparable to what is known in rotary synchronous machines as a "converter motor" is obtained. For more background on this type of motor see Siemens-Zeitschrift vol. 45 (1971), no. 4, pages 177 to 179.

When feeding a synchronous linear motor through a controlled inverter, the following factors must be considered as with any synchronous motor:

a. possible electromechanical hunting of the synchronous motor must be sufficiently damped by a superimposed control;

b. flipping (falling out of synchronism), which may be caused, for example, by an increase in load, must be reliably prevented; and c. as far as possible, the synchronous motor should be operated at the optimum operating point, i.e., with low ohmic losses.

To meet the conditions (a) to (c), it is necessary to continuously measure the operating state of the synchronous linear motor. For the control and regulation of a synchronous motor, it is particularly important to detect the position of the moving part. In the case of a rotating synchronous machine, the angular position of the rotor, which is referred to the pole pitch and is measured in "electrical degrees", can be ascertained by means of a magnet-wheel position transducer which is attached, for example, at the revolving shaft. In a synchronous linear motor used, for example, in a high-performance rapid-transit railroad, a quantity hereinafter referred to as "pole position" corresponds to this angular position. It indicates the position of the translator within a pole pitch of the stator. During travel at constant speed, the translator periodically occupies the same pole position. This pole position can be determined by measurement. However, it must be determined very accurately, which presents difficulties. Furthermore, the information regarding the pole position is not required at the self-propelled vehicle itself, but at a stationary station housing the converter which may be far removed from the vehicle. The control element for all control actions, and therefore also for those actions which depend on a measurement of the pole position, is the converter, which is controlled in accordance with the operating state of the synchronous machine. While the transmission of the pole position could be accomplished by radio signals between the self-propelled vehicle and the converter station, the attending expenditure would be considerable. In particular, additional measures would have to be taken to ensure that the transmission is interference-and error-free.

It is an object of the invention to provide a circuit arrangement having position-dependent timing in accordance with prior art converter motors, but to insure at the same time that accurate information regarding the pole position is available at the location of the converter without the need for information transmission by radio or other communication channels between the self-propelled vehicle and the converter station.

SUMMARY OF THE INVENTION

According to the present invention, this problem is solved by supplying the stator of the synchronous linear motor with variable voltage and frequency from a stationary, controlled static converter; by timing the converter as a function of the pole position of the translator; and by calculating pole position using a computing circuit having as inputs values of the voltage, current and frequency prevailing at the point of the converter feeding into the stator.

Where an excitation winding with a magnetic core is used as the exciter, the converter should particularly comprise a controlled or uncontrolled rectifier and a controlled inverter connected with each other through a d-c link. The maximum output frequency of such an intermediate-link converter may be between 200 and 500 Hz. If, however, an excitation winding of superconductive material is used as the exciter, a direct converter as well as an intermediate-link converter may be used. The direct converter is preferred for a maximum output frequency which is lower than the usual system frequency of 50 or 60 Hz. The converters are preferably equipped here with semiconductor rectifiers such as thyristors.

In a disclosed form of calculation, the computing circuit computes from the values of the voltage, current and frequency at the feeding point as well as from the resistance value and the inductance of the synchronous linear motor, as an indication of the pole position of the translator, the phase angle which exists between the voltage and the fictitious, not directly measurable, main field voltage (hereinafter the main field voltage) which is induced in the traveling-field winding by the motion of the translator. However, it is also possible for the computing circuit to compute from the values of the voltage, current and frequency as well as from the resistance value and the inductance of the synchronous linear motor, as an indication of the pole position of the translator, the phase angle which exists between the current and the main field voltage which is induced in the traveling-field winding by the motion of the translator.

It is particularly advantageous in view of the control of the converter if the computing circuit uses the coordinate data of the voltage vectorially referred to a reference signal, the coordinate data of the current vectorially referred to the same reference signal and the frequency at the feeding point as well as the resistance and the inductance of the synchronous linear motor, to compute the phase angle existing between the reference signal main field voltage, which is induced by the motion of the translator in the traveling-field winding. Such a circuit arrangement has as an advantage that the signal for the pole position is referred to a predetermined reference signal which is not dependent on the operating state of the linear motor.

In principle, cartesian or polar coordinates can be used as the coordinates. A preferred embodiment starts with polar coordinates. The computing circuit computes the phase angle from the value of the magnitude and phase angle of the voltage at the feeding point, vectorially referred to the reference voltage, from the values of the magnitude and the phase angle of the current at the feeding point, vectorially referred to the same reference signal and from the value of the frequency and from the resistance value and the inductance of the synchronous linear motor. By using polar coordinates, the individual elements of the circuit arrangement can be constructed particularly in a simple manner.

DETAILED DESCRIPTION OF PREFERRED EMBODIMENT

Figure 1:
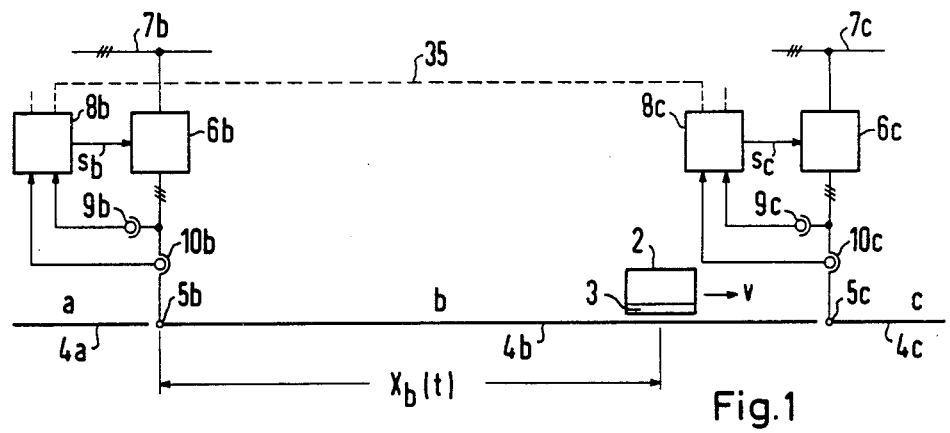
FIG. 1 is a block diagram showing two circuit arrangements according to the present invention for driving a self-propelled vehicle.

FIG. 1 is a block diagram of two circuit arrangements according to the present invention connected for the operation of a track-bound self-propelled vehicle 2, which is moved at variable speed v along a predetermined roadbed. The self-propelled vehicle 2 contains an excitation winding 3, which extends over the entire length of the vehicle. In the illustrated embodiment winding 3 is supplied with d-c current. Feeding with a-c current or variable d-c current is also possible. The excitation winding 3 is also called the translator. It may be wound of a superconductive material. However, it is also possible to use in its place, permanent magnets or a conventional exciter winding equipped with an iron core.

The entire line is subdivided into a number of line sections, of which three sections, $a$, $b$, and $c$ are shown on FIG. 1. Each line section $a$, $b$ and $c$ contains a three-phase traveling-field winding, which is the stator of the synchronous linear motor comprising it, together with the exciter winding 3 moving over it. The three traveling-field windings 4a, 4b and 4c are shown schematically on FIG. 1.

Stationary, controlled static converters 6b and 6c are connected to the feeding points 5b and 5c of the individual traveling-field windings 4b and 4c, respectively. Converters 6b and 6c may be supplied from a common three-phase supply system, or as shown, from two separate three-phase supply systems 7b and 7c. Control signals $s_b$ and $s_c$ permit feeding power with the desired voltage, frequency and phase from the supply system 7b and 7c through converters 6b and 6c into the individual traveling-field windings 4b and 4c. The control signals $s_b$ and $s_c$ are generated in control and regulating devices 8b and 8c, which will be described below in connection with FIG. 2.

As noted above, the individual line sections of the travelling-field windings 4a, 4b and 4c each form the stator of a synchronous linear motor. The vehicle 2 has at its bottom surface a number of magnet poles, which are excited by the exciter winding 3 similar to the rotor of a rotating synchronous machine. They generate the thrust required for propulsion in interaction with the travling field on the line. When the self-propelled vehicle 2 has left one of the line sections $b$ or $c$, the corresponding converter 6b or 6c is switched off.

Linear and rotating synchronous machines have similar operating characteristics. This results in basically the same requirements for each control signal $s_b$ and $s_c$ as are present for the converter supply of rotating synchronous machines. To eliminate the tendency of the synchronous linear motor 3, 4 to hunt and to avoid flipping in the event of overload, the generation of the control signal $s_b$ and $s_c$ for each converter 6b and 6c must be dependent on the respective operating status of the linear motor. With a rotating synchronous machine the measurement of the magnet wheel position, for example, using a magnet-wheel position transducer rigidly connected with the shaft of the synchronous machine is necessary. Proceeding the same way with the synchronous linear motor 3 or 4, it would be necessary to measure the pole position of the self-propelled vehicle 2, moving for example, at up to 500 km/hr, with an accuracy of millimeters using a device carried on the vehicle. It would further be necessary to transmit the measured value through radio communication channels or the like to the stationary converters 6 b and 6c. Such a procedure, however, presents technical problems and, in view of the high operational reliability required, also high costs.

The direct measurement of the pole position at the location of the self-propelled vehicle 2 and the subsequent transmission of the measured data through radio is avoided in accordance with the present invention. Instead, the operating status of the linear motors 2 and 3 are calculated from the values of the voltage and the current at the respective feeding points 5b and 5c.

Each control and regulating device 8b and 8c contains a computing circuit (not shown in FIG. 1). The computing circuit in the control and regulating device 8b, for example, determines at every point in time t the pole position of the translator 3. The computation is made from the values of the voltage, the current and the frequency at the feeding point 5b of the stator 4b. In principle, the values of the voltage, current and frequency can be measured directly used a voltage transformer 9b and a current transformer 10b. The converter 6b is timed as a function of the computed value of the pole position of the translator 3. The same applies to the control and regulating device 8c as well as the associated voltage transformer 9c and the associated current transformer 10c.

Figure 2:
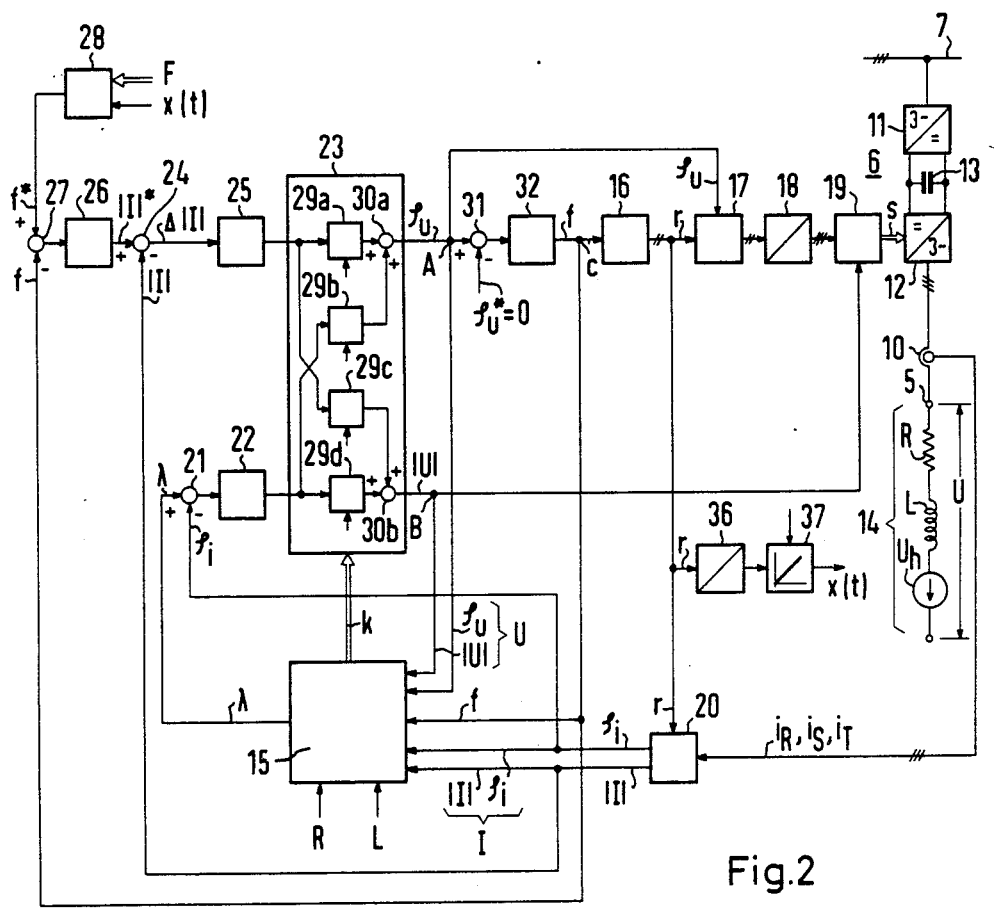
FIG. 2 is a schematic-block diagram of a circuit arrangement according to the present invention with a static converter and a control and regulating arrangement.

FIG. 2 shows a circuit arrangement according to the present invention with a static converter 6 and an associated control and regulating device. The converter 6 comprises an uncontrolled rectifier 11 and a controlled inverter 12, connected with each other through a d-c link with a smoothing capacitor 13 and impressed link voltage. The rectifier 11 is connected to a three-phase supply network 7. The inverter 12 is designed as a pulse inverter and supplies a synchronous linear motor 14, whose feeding point 5 is connected directly to the output of the inverter 12. The synchronous linear motor 14 is shown in the form of its equivalent circuit. It thus consists of a resistance with the value R, an inductive reactance with the inductance L and a fictitious opposing voltage source with the main field voltage $U_h$. This may be a synchronous linear motor 14 having a rotor which is a superconducting magnet coil without an iron core, a magnet coil and an iron magnetic core or a permanent magnet.

The computing circuit 15 of FIG. 2 will be described first. A total of seven signals go into computing circuit 15. First, there are two signals which describe the voltage vector U at the feeding point 5, i.e., at the output of the inverter 12. Any vector is determined by its magnitude and a phase angle. Accordingly, the voltage vector U at the feeding point 5 is completely described by a signal |U|, which represents its magnitude, and by a signal $\phi_u$, which represents its phase angle, referred to a reference signal.

It should be noted at this point that the signals $\phi_u$ and |U| for the voltage vector U are formed not on the basis of a voltage measurement at the output of the inverter 12, but are taken off in the interior of the control and regulating device at the points A and B. This is advantageous since the required signals are, in any case, formed in the control and regulating device as control variables for the inverter 12. Picking up the actual value of the voltage at the output of the inverter 12 is also possible, but requires an additional equipment and expense.

For the sake of simplicity, in the following all signals are designated with the information associated with them. For example, the signal |U| is therefore simply designated as a voltage magnitude and the signal $\phi_u$ as the voltage phase angle. Furthermore, the frequency $f$ of the fundamental of the a-c output voltage U is entered in the computing circuit 15. The frequency $f$ is taken off at a point C in the interior of the control and regulating circuit.

The computing circuit 15 has as further inputs two signals which describe the magnitude of the current |I| and the current phase angle $\phi_i$. These signals are derived, as will be explained later on in detail, from a measurement of the current at the feeding point 5 by means of a current transformer 10.

Finally, the resistance value R and the inductance L of the synchronous linear motor 14 are entered in the computing circuit 15. These signals may be given either as fixed values or may be determined by direct measurement at the line section in question. The latter is more accurate for the calculation, but is also more expensive. Direct measurement of the resistance and/or the inductance L may be indicated if the synchronous linear motor 14 heats up the traveling-field winding differently in variable operation (acceleration, braking.)

The computing circuit 15 computes from the seven entered signals the phase angle $\lambda$ of the main field voltage $U_h$. The main field voltage $U_h$, which is induced in the traveling-field winding by the motion of the translator, is a fictitious, not directly measurable quantity. To illustrate the computation process, FIG. 3 now will be described. The quasi-stationary operating behavior of the synchronous linear motor 14 is shown in vector diagram form thereon. The diagram also contains a reference system, which is formed by the orthogonal vectors $Re$ and $jIm$. $Re$ represents a real axis and $jIm$ an imaginary axis. E is a unit vector in the direction of the vector $Re$. The vector diagram rotates with the frequency $f$.

Figures 3, 4:
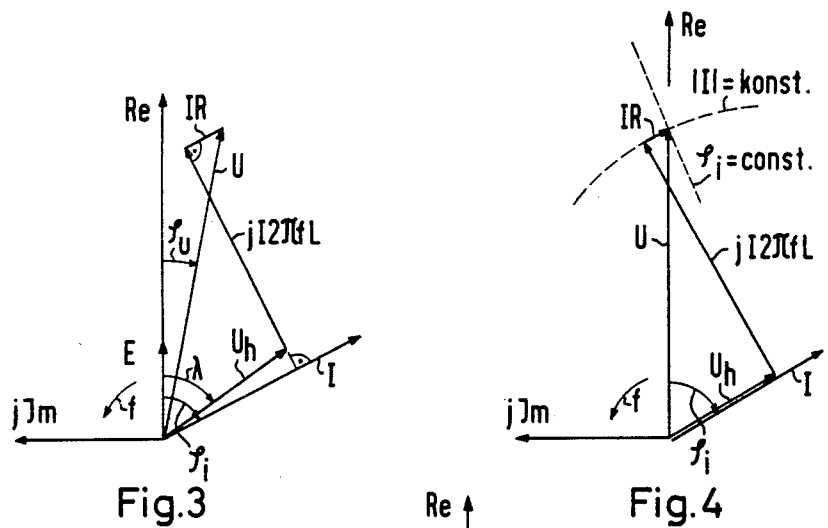
FIG. 3 is a vector diagram helpful in understanding the operation of the converter.
FIG. 4 is a vector diagram showing the optimum stationary operation of the converter.

In FIG. 3, the voltage vector U and the current vector I at the feeding point 5 (see FIG. 2) are shown. The voltage vector U is composed of the geometric sum of the main field voltage $U_h$ induced in the traveling-field winding by the self-propelled vehicle 2 and the voltage drops IR and $jI2\pi fL$ at the resistance and the inductive reactance, respectively. The unit vector and the voltage vector U subtend the voltage phase angle $\phi_u$. The current vector and the unit vector subtend the current phase angle $\phi_i$ and the unit vector and the main field voltage vector $U_h$ subtend the phase angle $\lambda$.

It is initially presumed that the difference angle ($\lambda - \phi_u$), i.e., the angle between the voltage vector U at the feeding point 5 on the main field voltage $U_h$ induced in the traveling-field winding by the motion of the translator is a measure of the pole position of the translator. This follows from the analogy to the rotating synchronous motor. Consequently, the phase angle $\lambda$ is also a measure of the pole position of the translator. It is evident from FIG. 3 that the phase angle $\lambda$ and the magnitude of the main field voltage $U_h$ can be calculated without difficulty according to the vector diagram shown if the values U, I, $f$, R and L are known.

Returning to FIG. 2, the computing circuit 15 shown performs a calculation of the phase angle $\lambda$ according to the vector diagram in FIG. 3. The phase angle $\lambda$ is subsequently used for timing the inverter 12. In the present embodiment, the reference system with the vectors R$e$ and $j$I$m$ shown in FIG. 3 is used for the simplification of the processing of measured-data in calculating the phase angle $\lambda$. This reference system, which rotates with the frequency $f$, is implemented with a reference-signal generator 16. Reference signal generator 16 is a conventional voltage controlled oscillator of adjustable frequency $f$, which furnishes at its output a two-phase reference signal $r$ of fixed amplitude. Reference signal $r$ is, for example, representing the unit vector E (see FIG. 3), which is in the direction of the vector R$e$ of the rotating reference system R$e$, $j$I$m$, in stationary cartesian coordinates. In implementation, it is thus defined by a sine signal and the corresponding cosine signal of the same amplitude and frequency. The amplitude has the normalized value one.

The two-phase reference signal $r$, which corresponds to the unit vector E in FIG. 2, is fed to a phase shifter 17 and is rotated with the aid of the latter by the phase angle $\phi_u$, obtained from point A. The two-phase signal obtained in this manner describes the phase angle $\phi_u$, through which the output voltage of the inverter 12 is to be rotated relative to the reference signal $r$ of the reference signal generator 16. It is thus a vector of the normalized magnitude one with direction corresponding to that of the voltage vector U. The signal from phase shifter 17 is an input to a coordinate transformer 18, which converts the two-phase information into symmetrical three-phase information, i.e., it provides three output signals shifted relative to each other by 120°, with one of the output signals rotated relative to the sine component of the reference signal $r$ by the phase angle $\phi_u$.

The three output signals are fed to the inverter control 19 for the three-phase inverter 12. The magnitude of the voltage |U| is fed to the inverter control 19 from the point B as a further input quantity. In the inverter control 19, multiplication of the absolute values takes place first. The three output signals of the coordinate transformer 18, which are assumed to have the amplitude one now will have the amplitude value |U|. The inverter control 19 uses these values to form control signals $s$. The firing pulses derived therefrom change the output voltage U of the inverter 12 as to magnitude |U|, frequency $f$ and phase $\phi_u$.

The description and presentation in FIG. 2 to this point assumed a converter 6 with an uncontrolled rectifier 11 and a pulse inverter as the inverter 12. It is also possible for the rectifier 11 to be controlled. In such a case, the d-c voltage in the intermediate d-c link is varied through the control input of an added d-c control. In that case, the absolute value of the voltage |U| is not applied to the input of the inverter control 19, but to input of the d-c control (not shown). Also, an unpulsed converter rather than a pulsed inverter will be used as the inverter 12. It is furthermore possible to use a direct converter as the converter 6. Such will be particularly advantageous if a superconducting exciter winding without iron is involved.

The reference signal $r$ of the reference signal generator 16 is also fed to a fundamental-wave analyzer 20. Fundamental-wave analyzer 20 has the three stator currents $i_R$, $i_S$ and $i_T$ from the current transformer 10 as additional inputs. Fundamental-wave analyzer 20 evaluates the fundamental waves of the stator currents $i_R$, $i_S$ and $i_T$. It processes the three input quantities $i_R$, $i_S$, and $i_T$ essentially inversely to the above components, i.e., the phase shifter 17, coordinate transformer 18 and inverter control 19 having the input quantities $\phi_u$ and |U|, and may be designed accordingly. Thus, with the aid of the reference signal $r$, it transforms the stator currents $i_R$, $i_S$ and $i_T$ into two signals which correspond to the current phase angle $\phi_i$ and the current magnitude |I|. The output quantities of the fundamental-wave analyzer 20 are thus signals which define the current vector I of FIG. 3 unequivocally. In the present case the current vector I is represented in polar coordinates, i.e., by the magnitude |I| and the phase angle $\phi_i$ with reference to the reference system R$e$, $j$I$m$. In principle, it is also possible to represent it in Cartesian coordinates.

It follows from what has been said so far that the magnitude |U| and the phase angle $\phi_u$ of the voltage U are at the same time controlled variables. These signals can therefore be taken off at suitable points of the control and regulating circuit, as already indicated above. Special measuring transducers and harmonic filters which would be required in the case of a direct take-off at the feeding point 5 are thus unnecessary.

It should be emphasized once more that the pole position of the translator, characterized by the phase angle $\lambda$, can be calculated by means of the computing circuit from the value of the voltage U, the current I and the frequency $f$ at the feeding point 5 of the stator, taking into consideration the resistance value R and the inductance L. The operating state of the synchronous linear motor 14 is thereby known, according to FIG. 3, at any moment.

The efficiency of the synchronous linear motor 14 depends greatly on size of the line losses I²R along the track, I being the supply current and R the value of the resistance. Operation with mininum current I is therefore desirable, and the required thrust force can be supplied by a large number of magnet poles in the propulsion vehicle. If the current I is given, the maximum thrust force is generated when the current ampere-turn wave of the stator winding is in phase with the induction wave of the excitation system. In other words, this condition, which will be called the optimum operating point is present when the current vector I in FIG. 3 is in the same direction as the main field voltage vector $U_h$. Then, the relation:

$$\lambda = \phi_i \quad (1)$$

is present.

FIG. 4 shows the vector diagram for optimum stationary operation, which follows from the vector diagram of FIG. 3, taking the condition of equation (1) into consideration. In addition, curves |I| = const and $\phi_i$ = const, i.e., for constant current magnitude |I| and constant current phase angle $\phi_i$, are shown thereon by the dashed lines.

Operation at the optimum operating point can now be forced by a control loop by means of the information, the acquisition of which was described above. A further control loop controls the current magnitude |I|. The accuracy with which the optimum operating point is maintained does not depend on the value of the resistance R of the synchronous linear motor 14, making this solution particularly advantageous. Temperature variations at the traveling-field winding thus have no interfering effect on the optimum operating point.

As shown on FIG. 2, the phase angle $\lambda$ determined by the computing circuit 15 is fed to a summing junction 21 in the operating point control loop and is compared there with the current phase angle $\phi_i$, which is furnished from the output of the fundamental-wave analyzer 20. The angle difference ($\lambda - \phi_i$) which represents the deviation from the optimum operating point, is fed to a current angle regulator 22, whose output is connected with the first input of a decoupler 23. As with all controllers and regulators herein, regulator 22 may be an integrator such as that described in "Applications Manual for Operational Amplifiers for Modeling, Measuring, Manipulating and Much Else," Philbrick/Nexus Research, 1968. At the two outputs A and B of this decoupler 23, two control variables appear. One control variable is the voltage phase angle $\phi_u$ and the other is the voltage magnitude $|U|$.

The current angle regulator 22 thus insures that the optimum operating point is maintained for a given current magnitude $|I|$. This current magnitude $|I|$ is regulated in a further control loop which comprises a summing junction 24 and a current-magnitude regulator 25. The actual value of the current magnitude $|I|$ is fed from the output of the fundamental-wave analyzer 20 as an input variable to summing junction 24. A current-magnitude reference value $|I|$ is provided as a further input quantity. The deviations $\Delta I = |I|^* - |I|$ is fed from the output of the summing junction 24 to the input of the current-magnitude regulator 25. The output of the latter acts on the second input of the decoupler 23. The current-magnitude regulator 25 controls the thrust of the propulsion vehicle.

The current-magnitude reference value $|I|^*$ may be a fixed quantity and can, for example, be taken off from a potentiometer (not shown). Preferably, however, it is taken from a superimposed frequency or speed control loop. This frequency control loop comprises a frequency controller 26, which is preceded by a summing junction 27. At the summing junction 27, the frequency $f$ of the inverter 12 which in principle can be taken off at any suitable point in the control and regulating circuit and is taken off here at the point C, is compared with a predetermined frequency reference value $f^*$. The frequency reference value $f^*$ is furnished in the present case by a speed control computer 28, in which a travel program F is stored. In the speed-control computer 28, information $x(t)$ regarding the instaneous position of the translator on the line at any time $t$ is also entered.

To explain the function of the decoupler 23, the vector diagram of FIG. 4 for the optimum stationary operation of the synchronous linear motor 14 will be used. If only the current magnitude $|I|$, i.e., the length of the current vector I, is to be changed, then the magnitude $|U|$ along with the voltage phase angle $\phi_u$ of the voltage vector U must be adjusted so that the tip of the voltage vector U follows the dashed straight line $\phi_i =$ const. If, on the other hand, the current phase angle $\phi_i$ is to be changed, the voltage magnitude U along with the voltage phase angle $\phi_u$ of the voltage vector U must be adjusted so that the tip of the voltage vector U moves along the dashed curved line $|I|$ = const. In both cases, both quantities $\phi_u$, $|U|$ are thus changed.

In order to take this situation into consideration, the decoupler 23 of FIG. 2 has four amplifiers 29a, 29b, 29c and 29d, whose gain in each case is adjustable through correction signals k, which are formed and furnished by the computing circuit 15 as a function of the respective operating point. The decoupler 23 also contains two summing members 30a and 30b, e.g., summing amplifiers whose outputs supply the control variables $\phi_u$ and $|U|$, respectively, at the output points A and B.

The arrangement of the individual elements in the decoupler 23 is such that the output of amplifier 29a, whose input is from controller 25 and the output or amplifier 29b, whose input is from controller 22 are provided to the summing member 30a. The output of amplifier 29c having an input from controller 25 and the output of amplifier 29d having an input from controller 22 are provided to summing member 30b.

The gains of the amplifiers 29a to 29d are continuously adjusted in operation by the computing circuit 15 through the correction signals k. For less stringent dynamic control requirements the adjustment can be dispensed with, a single adjustment being sufficient. If the control dynamics is of rather secondary importance, the output of the current magnitude regulator 25 can be connected directly to the point A and the output of the current angle regulator 23 directly to the point B i.e., the decoupler 23 can be omitted.

Regarding the operating-point control loop and the current-magnitude control loop, it should therefore be remembered that the voltage magnitude $|U|$ and the voltage phase angle $\phi_u$ are changed until the condition of equation (1) which describes the optimum operating point, is fulfilled and until the current magnitude $|I|$ corresponds to the predetermined current-magnitude reference value $|I|^*$.

As already mentioned, the decoupler 23 provides the voltage phase angle $\phi_u$ at the output point A and the voltage magnitude $|U|$ at the output point B. These are the controlled variables for the control of the voltage U. A uniformly continuing change of the voltage phase angle $\phi_u$, for example, linear with time, at the output point A is an indication that at the point C the frequency signal $f$ does not correspond to the actual value of the frequency at the output of the converter 6. In this case, a correction of the frequency signal $f$ is required. For this purpose, the voltage phase angle $\phi_u$ is continuously compared at a summing junction 31 with a constant reference value $\phi_u^*$ which is for example, set to zero. The deviation determined is fed to a voltage angle regulator 32, which changes the frequency signal $f$ at the point C accordingly. The reference signal generator is therefore acted upon accordingly at its frequency control input and the desired correction is achieved. In this manner, a flipping-over of the linear motor 14 in the event of a load increase can also be prevented.

The case of the propulsion vehicle 2 of FIG. 1 entering the line section c following the line section b, will now be considered. Prior to the transition, the converter 6c must be switched to supplying the line section c. The current $I_c$ in the line section c must be controlled continuously as to magnitude and phase in such a manner that when passing the transition point no undesirable force action on the propulsion vehicle 2 is produced.

For that purpose the traveling field of the line section b must continue uniformly in the line section c. This means that the current vectors $I_b$ and $I_c$ in both line sections b and c must agree as to magnitude and phase. The transition condition:

$$I_b = I_c \qquad (2)$$

must therefore apply.

Figure 5:
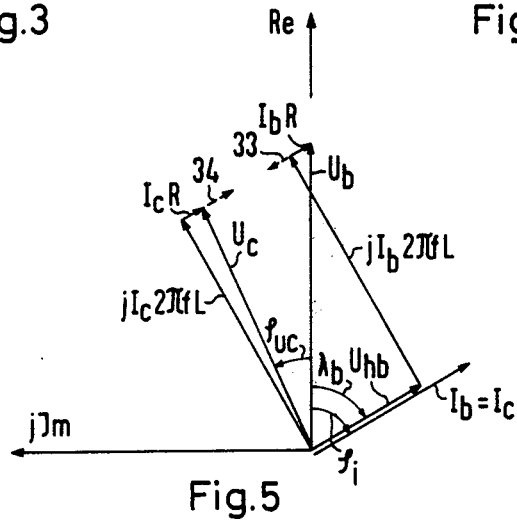
FIG. 5 illustrates vector diagrams for the transition of the self-propelled vehicle from one line section to the next.

In FIG. 5, vector diagrams for the linear motors formed by the adjacent traveling-field windings 4b and 4c for the case where the propulsion vehicle 2 is still located completely in the zone of the line section b are shown. The subscript b denotes the quantities in the line section b, the subscript c those in the line section c.

Figure 6:
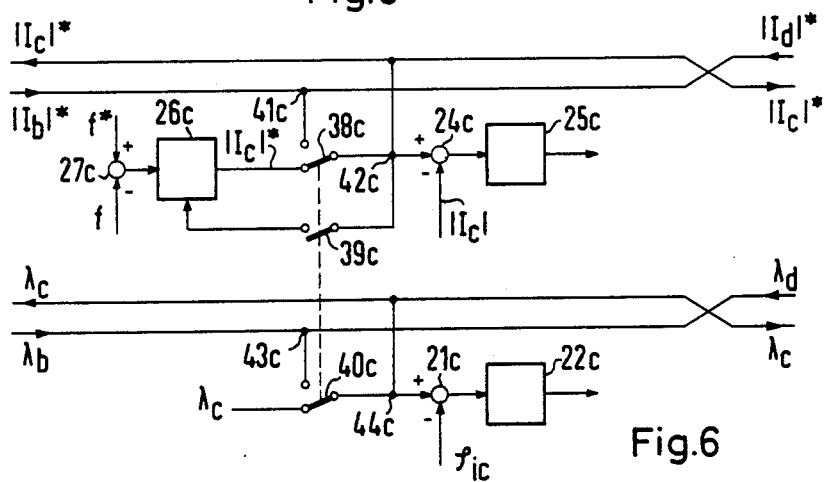
FIG. 6 is a schematic diagram of a circuit for switching the control variables in a converter station.

FIG. 6 shows a section of the control and regulating device of the line section c with an additional switching arrangement for two reference values. The control and regulating devices of the other line sections are constructed similarly. The switching arrangement comprises three switches 38c, 39c and 40c, which can be actuated simultaneously. The switch 38c switches the one input 42c of the summing junction 24c selectably to the output of the frequency control 26c or to a point 41c, at which sequentially, one after the other, the current-magnitude reference value $|I_b|^*$ or $|I_d|^*$ from the line section b and the line section d is present. At the same input 42c of the summing junction 24c the current-magnitude reference value $|I_c|^*$ of the line section c, which is effective at the current-magnitude regulator 25c, can be passed on to the control and regulating device of the adjacent line sections b and d. The input 42c is connected through the switch 39c with an additional input of the frequency control 26c. In this manner, the signal at the input 42c can be impressed on the output of the frequency control 26c, independent of its input signal. The switch 40c switches the one input 44c of the summing junction 21c selectably to the output of the computing unit 15c (not shown), which furnishes the phase angle $\lambda_c$, or to a point 43c, to which the phase angle $\lambda_b$ and $\lambda_d$, respectively, is supplied sequentially in time from the line sections b and d. From the input 44c of the summing junction 21c, the phase angle $\lambda_c$ can also be fed to the summing junctions, corresponding to the summing junction 21c, of the adjacent control and regulating devices.

Initially, no main field voltage $U_{hc}$ is induced in the line section c, as shown on FIG. 5. Therefore, the phase angle $\lambda_c$ is not defined in the line section c. For this reason, the control of the converter 6c is taken over by the control and regulating device of the converter 6b. To this end, the reference signal generator of the converter 6c is synchronized in equal and rigid phase relationship with the reference signal generator of the converter 6b. This is indicated schematically by the dashed line 35 in FIG. 1. The switches 38c, 39c and 40c (see FIG. 6) are in the upper switch position (external control.) Thereby, the reference values $|I_b|^*$ and $\lambda_b$ of the section b are fed to the current-magnitude regulator 25c and the current angle regulator 22c, respectively, of the section c as reference values. The transition condition of equation (2) is thereby complied with.

While the propulsion vehicle 2 enters the line section c, the main field voltage $U_{hc}$ increases steadily from zero in the corresponding vector diagram (see FIG. 5). Likewise, the main field voltage $U_{hb}$ in the vector diagram of the line section b decreases, as the propulsion vehicle 2 leaves the corresponding line section b. The position of the switches 38 to 40 (see FIG. 6) is not changed.

In order to continue to maintain the transition condition $I_b = I_c$, the voltage vectors $U_b$ and $U_c$ must be changed in opposite senses when the vehicle passes the transition point, in the direction of the arrows 33 and 34 shown dotted in FIG. 5.

If the propulsion vehicle 2 is in the middle between the two line sections b and c, the main field voltages $U_{hb}$ and $U_{hc}$ are equal in the two vector diagrams of FIG. 5. This is the condition for the transfer of the control to the control and regulating device of the next converter 6c. When this condition occurs, the switches 38c, 39c and 40c in FIG. 6 are moved to their lower switch position together, while simultaneously the corresponding switches in the control and regulating device of the line section b are moved to the upper switch position. Thereby, the control of the control and regulating device of the two line sections b and c for the current magnitude and the current phase angle passes to the control and regulating device of the line section c (internal control.)

When the propulsion vehicle 2 has left the line section b completely, the induced main field voltage $U_{hb}$ in this line section b assumes the value zero. The converter 6b can then be switched off.

In conclusion, FIG. 2 will be considered once more. Since the circuit arrangement shown there maintains the synchronous operation of the linear motor 14 under any operating conditions, the position of the propulsion vehicle 2 on the line can be determined continuously by digital integration from the reference signal r of the reference signal generator 16. For this purpose, an analog-to-digital converter 36 fed with the reference signal 4 drives a digital integrator 37. Digital integrator 37 may be a counter, and in particular, a bidirectional counter. Its output signal $x(t)$, which contains the position x of the propulsion vehicle 2 as a function of the time t is used as the actual value for a position control. For this purpose, the output signal $x(t)$ is fed according to FIG. 2 as an input signal to the travel-operation computer 28. From the output signal $x(t)$ information for train protection and likewise the correct point in time for connecting the line section next in the direction of travel can also be derived.

Figure 7:
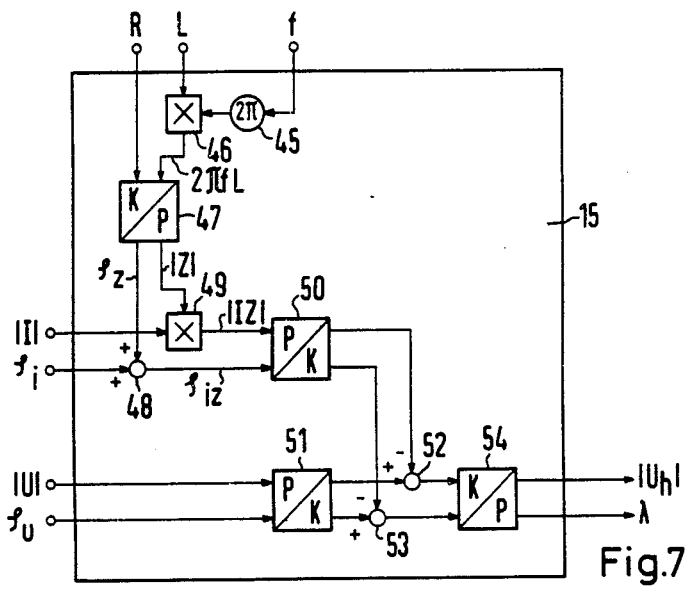
FIG. 7 is a block diagram of an analog computing circuit for computing the phase angle between the reference signal and the main field voltage.

FIG. 7 shows an analog computer circuit 15, by means of which the computation of the phase angle $\lambda$ between the reference signal 4 and the main field voltage $U_h$ can be performed in accordance with the vector diagram of FIG. 3.

According to FIG. 7, an analog signal proportional to the frequency f is first multiplied in an analog multiplier 45 by the factor $2\pi$ and subsequently fed to a further analog multiplier 46. Here the quantity $2\pi f$ is multiplied by the externally supplied inductance L. The quantity $2\pi fL$ calculated by the multiplier 46 is entered, together with the externally supplied resistance value R, to a coordinate transformer 47. This coordinate transformer 47 is designed so that it treats its two input signals R and $2\pi fL$ as Cartesian corrdinates and derives from them the corresponding polar coordinates. It delivers at its two outputs the signals $\phi_z$ and $|Z|$. $|Z|$ is the magnitude and $\phi_z$ the phase angle of this vector Z, which is to be considered as an impedance. In a summing member 48, such as a summing amplifier, the phase angle $\phi$ is added to the externally supplied current phase angle $\phi_i$. In a further analog multiplier 49, the quantity $|Z|$ is multiplied by the current magnitude I. At the outputs of the summing member 48 and the multiplier 49 the quantities $\phi_{iz}$ and $|IZ|$, respectively are present. These two quantities describe in polar coordinates a voltage vector (not shown) which in FIG. 3 would extend from the tip of the main field voltage vector $U_h$ to the tip of the voltage vector U. The current |I| multiplied by the impedance |Z| corresponds to a voltage drop which occurs at the traveling-field winding of the linear motor. The mentioned voltage vector is transformed in a further coordinate transformer 50 from polar coordinates into Cartesian coordinates.

The main field voltage vector U is obtained by subtracting from the voltage vector U out of coordinate transformer 51, the voltage vector from coordinate transformer 50, both being in Cartesian coordinates. For each coordinate, a succeeding subtraction point 52 and 53 respectively, is provided. These may be simply summing amplifiers coupled accordingly. At one point, one set of corresponding coordinate values is subtracted and at the other the cooresponding orthoganal coordinate values.

The output signals of the two subtraction points 52 and 53 describe the main field voltage vector $U_h$ in Cartesian coordinates. For converting it into polar coordinates, i.e., into the magnitude $|U_h|$ and the phase angle $\lambda$, a further coordinate transformer 54 is provided. Thus, the phase angle $\lambda$ is available at the output of the computing circuit 15 for further processing by the control and regulating device.

Figure 8A:
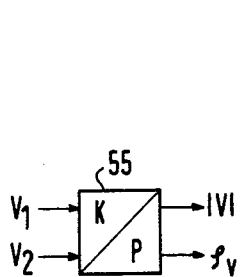
FIGS. 8a and 8b is a schematic diagram of a coordinate transformer.
Figure 8B:
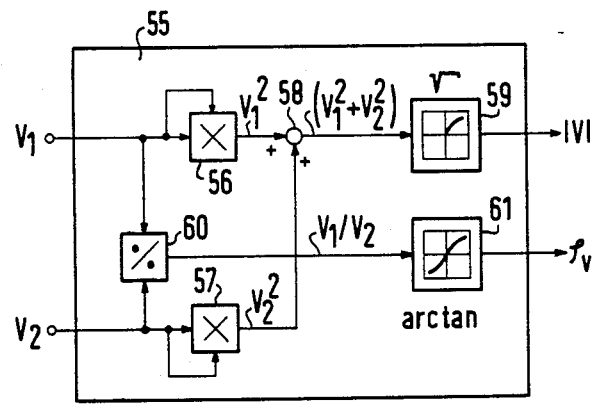

FIGS. 8a and 8b illustrate a coordinate transformer 55, which converts two signals $V_1$ and $V_2$, which can be considered as Cartesian coordinates of a vector V, into the corresponding polar coordinates of magnitude $|V|$ and phase angle $\phi_v$. This coordinate transformer 55 can therefore be used as the coordinate transformer 47 and/or the coordinate transformer 54 in FIG. 7.

It is seen from FIG. 8b that the signal $V_1$ is first multiplied by itself in a multiplier 56. Similarly, the signal $V_2$ also is multiplied by itself in a further multiplier 57. The two output signals $V_1^2$ and $V_2^2$ are added in a summing member 58 to form the sum signal $(V_1^2 + V_2^2)$. This is fed to a root-taking member 59, which takes the root thereof. At the output of the root-taking member 59 appears the magnitude $|V| = (V_1^2 + V_2^2)^{1/2}$. Root taking members may be constructed in accordance with paragraph 23 of the above referenced Philbrick/Nexus manual.

Within the coordinate transformer 55, an analog divider 60 is provided. The signals $V_1$ and $V_2$ are inputs thereto. The quotient $V_1/V_2$ appears at its output. This is fed to a function generator 61, which forms the arctan function therefrom. (This may also be constructed in accordance with the above manual.) The output signal of the function generator 61 corresponds to the phase angle $\phi_v = \arctan(V_1/V_2)$. The quantities $|V|$ and $\phi_v$ are the polar coordinates of the vector V.

Figure 9A:
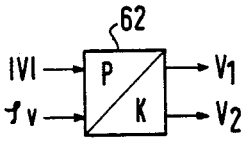
FIGS. 9a and 9b is a schematic diagram of a further coordinate transformer.
Figure 9B:
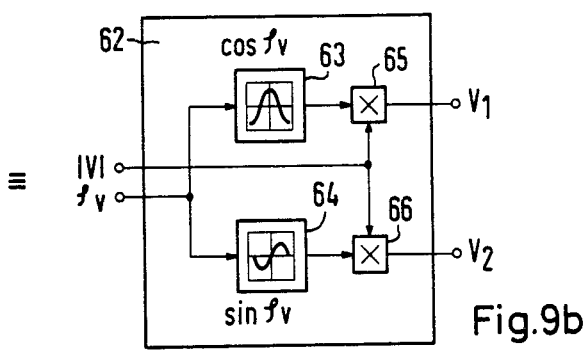

FIGS. 9a and 9b illustrate a coordinate transformer 62 which performs a reverse coordinate transformation to the coordinate transformer 55 of FIGS. 8a and 8b. It can be used as the coordinate transformer 50 and/or 51 in FIG. 7.

According to FIG. 9a, the magnitude $|V|$ and the phase angle $\phi_v$ of a vector V are fed to the coordinate transformer 62. At its two outputs appear the quantities $V_1$ and $V_2$, which define the vector V in Cartesian coordinates.

According to FIG. 9b, two function generators 63 and 64 are provided in the coordinate transformer 62 which form the cosine and sine signal corresponding to the phase angle $\phi_v$ fed-in. These too are described in the above manual. The cosine signal $\cos \phi_v$ is multiplied in a multiplier 65 by the magnitude $|V|$ of the vector. The output of the multiplier 65 is the signal $V_1$, the one Cartesian coordinate. In a further multiplier 66, the sine signal $\sin \phi_v$ of the function generator 64 is multiplied by the magnitude $|V|$. At this output the signal $V_2$ as the other Cartesian is present.

In FIG. 7, it was shown how the phase angle $\lambda$ can be obtained from the seven input quantities by means of the computing circuit 15. In conclusion, it should be emphasized that the phase angles $(\lambda - \phi_u)$ and $(\lambda - \phi_i)$ also can be calculated in a similar manner through the use of multipliers, adders and coordinate transformers according to the vector diagram in FIG. 3, dispensing with a reference system. These and other modifications may be made without departing from the spirit of the invention which is intended to be limited solely by the appended claims.

What is claimed is:

1. A circuit arrangement for the operation of a track-bound propulsion vehicle having a synchronous linear motor whose stator is installed along the roadbed as a traveling-field winding and whose exciter is arranged on the propulsion vehicle as a co-movable translator comprising:
    a. a stationary static converter for supplying the stator of the synchronous linear motor with variable voltage and frequency;
    b. means for timing the converter in dependence on the pole position of the translator; and
    c. means for calculating pole position from the values of voltage, current, and frequency at the feeding point of the converter into the stator.

2. The circuit arrangement according to claim 1, wherein said exciter comprises an excitation winding comprising a magnetic core and said converter comprises a rectifier and controlled inverter coupled with each other through an intermediate d-c link with impressed d-c voltage.

3. The circuit arrangement according to claim 1, wherein said means for calculating has as inputs the values of voltage, current, and frequency at the feeding point along with the resistance and inductance of the synchronous linear motor and computes, as a measure of the pole position of the translator, the phase angle existing between the feeding point voltage and the main field voltage which is induced in the traveling-field winding by the motion of the translator.

4. The circuit arrangement according to claim 1, wherein said means for calculating has as inputs values of voltage, current and frequency at the feeding point along with the resistance and inductance of the synchronous linear motor and calculates therefrom, as a measure of the pole position of the translator, the phase angle existing between the feeding point current and the main field voltage which is induced in the traveling field winding by the motion of the translator.

5. The circuit arrangement according to claim 1, wherein said means for calculating has as inputs: the coordinate values of the voltage referred to a reference, the coordinate values of the current referred to the same reference, and the frequency at the feeding point, along with the resistance and inductance of the synchronous linear motor, and computes therefrom, as a measure of the pole position of the translator, the phase angle which exists between the reference and the main field voltage which is induced in the traveling-field winding by the motion of the translator.

6. The circuit arrangement according to claim 5, wherein said means for calculating computes the phase angle ($\lambda$) from the values of the voltage magnitude and voltage phase angle of the voltage at the feeding point referred to said reference, from the values of the current magnitude and current phase angle of the current at the feeding point referred to the same reference, from the value of frequency and from the resistance and inductance of said synchronous linear motor.

7. The circuit arrangement according to claim 6, wherein said reference is developed in a reference signal generator providing a reference signal of predetermined frequency, wherein the current at said feeding point is obtained from a current transformer, the outputs of which are provided to a fundamental wave analyzer having as reference inputs the outputs of said reference signal generator and providing at its output a first signal indicating the current magnitude and a second signal indicating the current phase angle referred to said reference signal.

8. The circuit arrangement according to claim 7, wherein said reference signal generator provides as outputs a sine signal and a cosine signal of the same frequency and amplitude.

9. The circuit arrangement according to claim 7, wherein the frequency of said reference signal generator is adjustable.

10. The circuit arrangement according to claim 7, wherein said reference signal generator has its output coupled to an additional fundamental wave analyzer having as an input the voltage at the feeding point, obtained from a voltage transformer, said further fundamental wave analyzer providing as outputs a third signal indicating voltage magnitude and a fourth signal indicating voltage phase angle referred to said reference signal.

11. The circuit arrangement according to claim 6, wherein said means for timing said converter include a control circuit for the current magnitude.

12. The circuit arrangement according to claim 11, wherein said control circuit for said current magnitude comprising a current magnitude regulator having as inputs to its input summing junction the current magnitude output of said fundamental wave analyzer and a reference current magnitude signal.

13. The circuit arrangement according to claim 12, wherein said reference current magnitude signal is developed in a superimposed frequency control loop.

14. The circuit arrangement according to claim 6, wherein said means for timing said converter includes means for obtaining optimum stationary operation of the synchronous linear motor by regulating the angle between the current and the main field voltage such that it is zero.

15. A circuit arrangement according to claim 14, wherein said means comprise a current angle regulator having at its input summing junction the output of said computing means providing the phase angle of said main field voltage and the output of said fundamental wave analyzer providing the phase angle of said current.

16. The circuit arrangement according to claim 15, and further including a decoupler having first and second input terminals coupled respectively to the output of said current angle regulator and current magnitude regulator and having two outputs providing respectively a first signal representing the voltage phase angle and a second signal representing the voltage magnitude.

17. The circuit arrangement according to claim 16, wherein said decoupler is controlled in response to an output from said computing means as a function of the operating state of the linear motor.

18. A circuit arrangement according to claim 16, wherein said decoupler comprises first, second, third and fourth variable gain amplifiers and first and second summing means.

19. The circuit arrangement according to claim 16, wherein the signal representing voltage magnitude and the signal representing voltage phase angle used in said computing means are taken from the output of said decoupler.

20. The circuit arrangement according to claim 19, wherein a voltage regulator is provided having as inputs a reference value and said voltage phase angle from said decoupler, said voltage regulator providing its output as a frequency control input to said reference signal generator.

21. The circuit arrangement according to claim 20, and further including means for measuring at least one of the resistance and inductance of said synchronous linear motor and providing said measured value as an input to said computing means.

22. The circuit arrangement according to claim 21, wherein the reference signal output of said reference signal generator is used for determining vehicle velocity.

23. The circuit arrangement according to claim 22, wherein said reference signal generator output is coupled through an analog-to-digital converter to a digital integrator for determining said velocity.

24. The circuit arrangement according to claim 23, wherein the output signal of said digital integrator is provided as an input to a speed controller as the actual value for a superimposed position control.

25. The circuit arrangement according to claim 15, wherein the track is divided into line sections and a circuit arrangement is provided for each of said line sections and further including means for coupling the current magnitude reference values and current phase of the circuit arrangements of two adjacent line sections to the reference value input of the summing junction at the input of the said current magnitude regulator and to the reference value input of the summing junction at the input of said angle regulator.

* * * * *